United States Patent
Cheng et al.

(10) Patent No.: US 11,035,368 B2
(45) Date of Patent: Jun. 15, 2021

(54) PUMP CONTROL DESIGN TOOLBOX TECHNIQUE FOR VARIABLE SPEED PUMPING APPLICATIONS

(71) Applicant: FLUID HANDLING LLC., Morton Grove, IL (US)

(72) Inventors: Andrew A. Cheng, Wilmette, IL (US); Kyle D. Schoenheit, Waterloo, NY (US)

(73) Assignee: FLUID HANDLING LLC, Morton Grove, IL (US)

( * ) Notice: Subject to any disclaimer, the term of this patent is extended or adjusted under 35 U.S.C. 154(b) by 251 days.

(21) Appl. No.: 15/609,764

(22) Filed: May 31, 2017

(65) Prior Publication Data

US 2017/0356450 A1  Dec. 14, 2017

Related U.S. Application Data

(60) Provisional application No. 62/343,352, filed on May 31, 2016.

(51) Int. Cl.
*F04D 15/00* (2006.01)
*G05B 19/416* (2006.01)
*G05D 7/06* (2006.01)

(52) U.S. Cl.
CPC ........ *F04D 15/0066* (2013.01); *G05B 19/416* (2013.01); *G05D 7/0617* (2013.01); *G05B 2219/37371* (2013.01)

(58) Field of Classification Search
CPC ............. F04D 15/0066; G05D 7/0617; G05B 19/416; G05B 2219/37371

(Continued)

(56) References Cited

U.S. PATENT DOCUMENTS

| 4,581,707 A | 4/1986 | Millar |
| 6,178,393 B1 | 1/2001 | Irvin |

(Continued)

FOREIGN PATENT DOCUMENTS

| CN | 101050636 A | 10/2007 |
| CN | 201292954 Y | 8/2009 |

(Continued)

OTHER PUBLICATIONS

CN204480576 English language translation with Abstract.

(Continued)

*Primary Examiner* — Jigneshkumar C Patel
(74) *Attorney, Agent, or Firm* — Ware, Fressola, Maguire & Barber LLP

(57) ABSTRACT

Apparatus for providing variable speed pump control in a hydronic pump system having a system flow and pressure requirement, featuring a signal processor or processing module configured to: receive signaling containing information about a system characteristic curve, a system flow and pressure requirement for the hydronic pump system, and real time changes by a pump operator to at least one control parameter to adjust the performance of the hydronic pump system; and determine corresponding signaling containing information about a design/redesign of at least one pump, system or control curve to adjust the performance of the hydronic pump system to correspond with the system flow and pressure requirement of the hydronic system, based upon the signaling received.

20 Claims, 4 Drawing Sheets

Example of a display showing a pump control design toolbox.

(58) Field of Classification Search
USPC .......................................................... 700/282
See application file for complete search history.

(56) References Cited

U.S. PATENT DOCUMENTS

| | | | |
|---|---|---|---|
| 8,041,462 | B2 | 10/2011 | Milder et al. |
| 8,480,374 | B2 | 7/2013 | Yang |
| 8,892,221 | B2 | 11/2014 | Kram et al. |
| 2003/0196942 | A1 | 10/2003 | Jones |
| 2005/0123408 | A1 | 6/2005 | Koehl |
| 2010/0189572 | A1 | 7/2010 | Hansen |
| 2012/0022692 | A1* | 1/2012 | Hendrickson ...... G05B 23/0254 700/266 |
| 2012/0173027 | A1 | 7/2012 | Cheng et al. |
| 2013/0173027 | A1 | 7/2013 | Imes et al. |
| 2014/0005841 | A1* | 1/2014 | Cheng .................. G05D 7/0617 700/282 |
| 2014/0039836 | A1 | 2/2014 | Moricca et al. |
| 2014/0081430 | A1 | 3/2014 | Timsjo et al. |
| 2014/0316591 | A1 | 10/2014 | Karaki et al. |
| 2015/0016948 | A1 | 1/2015 | Bihler et al. |
| 2015/0045982 | A1 | 2/2015 | Egan et al. |

FOREIGN PATENT DOCUMENTS

| | | | |
|---|---|---|---|
| CN | 101975156 | A | 2/2011 |
| CN | 102418703 | A | 4/2012 |
| CN | 102808759 | A | 12/2012 |
| CN | 104122801 | A | 10/2014 |
| CN | 204480576 | U | 7/2015 |
| DE | 10029568 | A1 | 7/2003 |
| DE | 102014000678 | A1 | 7/2015 |
| RU | 2546342 | C2 | 4/2015 |
| WO | 2015166132 | A1 | 11/2015 |

OTHER PUBLICATIONS

CN201292954 English language translation with Abstract.
CN104122801 English language translation with Abstract.
CN102808759 English language translation with Abstract.
CN102418703 English language translation with Abstract.
CN101975156 English language translation with Abstract.
CN101050636 English language translation Abstract.
"SENCILLO™ Control Panels," Sencillo™, sencillosystems.com, Nov. 24, 2015, printed out on Jun. 20, 2016. http://web.archive.org/web/20151124050603/http://www.sencillosystems.com/control-panels.html.
"Integrated Motor Control Centers," Lindsay™ Corporation, watertronics.com, Nov. 10, 2014, printed out on Jun. 20, 2016. http://web.archive.org/web/20141110154725/http://www.watertronics.com/integrated-motor-control-centers.
"Control Freak" Touch-screen Controller, Hydra Cell®, pfcequip.com, SCMC-06.15, Feb. 2016, printed out on Jun. 20, 2016. http://pfcequip.com/wp-content/uploads/2016/02/hydra-cell-Control_Freak.pdf.
Hollifield, Bill and Hector Perez, "High Performance Graphics to Maximize Operator Effectiveness," PAS®, isa.org, 2012. https://www.isa.org/standards-and-publications/isa-publications/intech-magazine/white-papers/pas-high-performance-graphics-to-maximize-operator-effectiveness/.
"Clean Water Controls: H2PrO Constant Speed Water Booster Pump Controller," Usemco®, usemco.com, Jun. 17, 2015, http://web.archive.org/web/20150617203842/http://www.usemco.com/water-pump-controller/.
"Hydraulic Pump Controller (HPC)," NOV, nov.com, DPF1000006-MKT-001 Rev 01, printed out Jun. 20, 2016. https://www.nov.com/WorkArea/DownloadAsset.aspx?id=15177.
DE102014000678 English language translation with Abstract.
DE10029568 English language translation with Abstract.
English Abstract of RU 2546342.

* cited by examiner

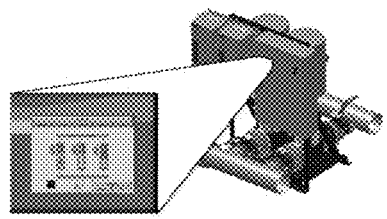
Figure 1A
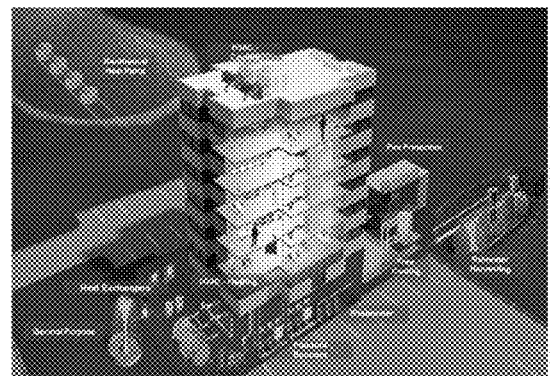
Figure 1B
Figure 1: Variable speed pump control systems with advanced energy saving and sensorless control technologies.
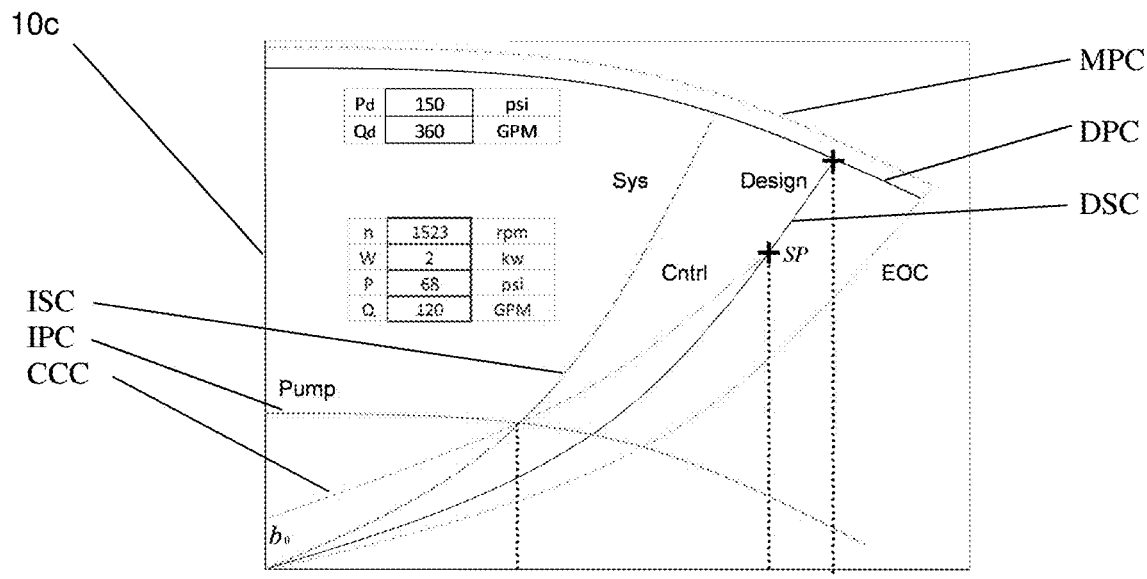
Figure. 2: Example of a display showing a pump control design toolbox.

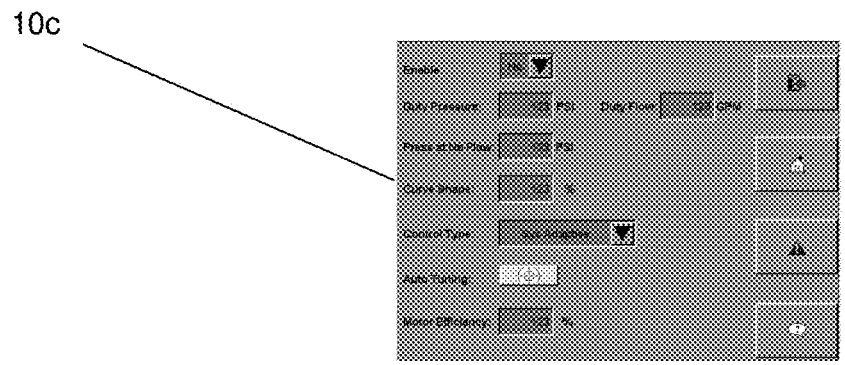
Figure 3: Example of a display of a pump control design toolbox set up screen.
Figure 4: Example of a touch screen pumping control system with pump control design toolbox.
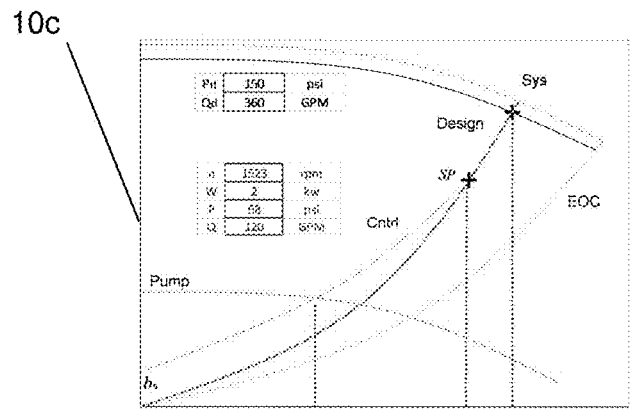
Figure 5: Example of a display of a setup for a constant dynamic fraction loss system.

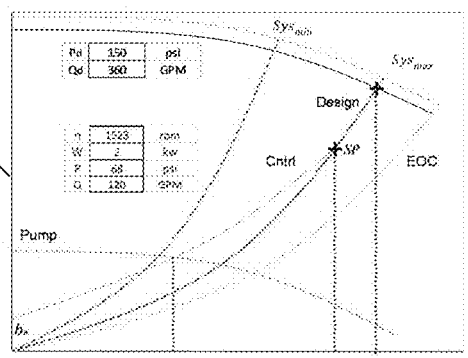
Figure 6: Example of a display of a setup
with a limited dynamic fraction loss varation region.
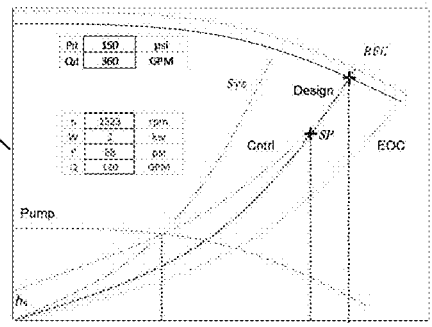
Figure 7: Example of a display of a setup
of a varying system within full pump operation hydronic domain.

Apparatus 10, e.g., a pump control design toolbox,

Signal processor or processing module 10a configured at least to:

receive signaling containing information about receive signaling containing information about a system characteristic curve, a system flow and pressure requirement for the hydronic pump system, and real time changes by a pump operator to at least one control parameter to adjust the performance of the hydronic pump system;

determine corresponding signaling containing information about a design/redesign of at least one pump, system or control curve to adjust the performance of the hydronic pump system to correspond with the system flow and pressure requirement of the hydronic system, based upon the signaling received; and/or provide the corresponding signaling as control and/or display signaling to control the apparatus and/or a display.

Other signal processor circuits or components 10b that do not form part of the underlying invention, e.g., including input/output modules, one or more memory modules, data, address and control busing architecture, etc.

A display 10c configured to receive display signaling, and provide display functionality containing information about the design/redesign of at least one pump, system or control curve to adjust the performance of the hydronic pump system to correspond with the system flow and pressure requirement of the hydronic system.

Figure 8

PUMP CONTROL DESIGN TOOLBOX TECHNIQUE FOR VARIABLE SPEED PUMPING APPLICATIONS

CROSS REFERENCE TO RELATED APPLICATION

This application claims benefit to U.S. provisional application No. 62/343,352, filed 31 May 2016, which is hereby incorporated by reference in its entirety.

The present invention builds on the family of technologies disclosed in the other related applications identified below.

BACKGROUND OF THE INVENTION

1. Field of the Invention

The present invention relates to a technique for controlling a pumping system and pumping related applications in such a pumping system.

2. Brief Description of Related Art

Reference nos. [1-9] set forth below disclose various variable speed pump controls with advanced energy saving and sensorless control technologies for heating and cooling close loop hydronic applications, pressure booster, industrial and agriculture applications, e.g., see FIG. 1, which are all assigned to the assignee of the present application. With all new technologies introduced, some traditionally unknowns pump system operation parameters or characteristics curves, such as vary system characteristics curve, adaptive control set point, pressure or flow rate (without sensors), and so forth, become known and may be presentable up to engineers and operators for better understanding the pump_system_control operation status in real time.

By way of further example, reference no. [10] below discloses a real time graphic sensorless energy saving pump controller, e.g., which includes mainly a real time graphic pump-system-control operation display and monitoring module, based upon pump characteristics data selected from a pump data base as well as run time operation variables provided from an energy saving control module and a sensorless converter module integrated with, which is also assigned to the assignee of the present application. With a graphic touch screen in terms of real time graphic and numerical display, one can not only observe the pump and system characteristic information such as the intersection of pump, system and control curves in a real time manner inside of the pump operation region charted with maximum pump curve and end of curve, but one can also observe corresponding control values such as instant flow rate and pressure, adaptive set point value, and so on so forth, under which pump is operated at the time as well.

SUMMARY OF THE INVENTION

In summary, the present invention provides a new pump control design toolbox for variable speed pump controls, with which a desired pump control curve may be obtained throughout a design pump characteristics curve reconfigured interactively and in real time based upon system characteristics on site, to meet the flow and pressure requirement in the system. The pump control design toolbox makes pump control setup procedures reformulated significantly, with the pump control operation set up and maintenance much easier, and for any unknown hydronic systems applications to achieve the best pumping operation efficiency to save energy. In addition, the toolbox pump control design may include a hydronic system recognition module integrated with system and flow adaptive control so that an automatic pump control setup function may be realized to setup and run on a hydronic system automatically with the minimized pumping energy consumption.

SPECIFIC EMBODIMENTS

By way of example, the present invention provides a new and unique technique for providing variable speed pump control in a hydronic pump system having a system flow and pressure requirement.

According to some embodiments, the present invention may include, or take the form of, apparatus, e.g., featuring a signal processor or processing module configured to:

receive signaling containing information about a system characteristic curve, a system flow and pressure requirement for the hydronic pump system, and real time changes by a pump operator to at least one control parameter to adjust the performance of the hydronic pump system; and determine corresponding signaling containing information about a design/redesign of at least one pump, system or control curve to adjust the performance of the hydronic pump system to correspond with the system flow and pressure requirement of the hydronic system, based upon the signaling received.

According to some embodiments, the present invention may include one or more of the following features:

The apparatus may include, or form part of, a pump control design toolbox configured with a combination of the signal processor or processing module and a display for providing display functionality related to the pump control design toolbox.

The signal processor or processing module may be configured to provide the corresponding signaling as display control signaling; and the apparatus may include a display that responds to the display control signaling and provides display signaling containing information, e.g., about:

at least one of the system characteristic curve and the system flow and pressure requirement for the hydronic pump system; and a pump control design toolbox set up screen having the at least one control parameter to adjust the performance of the hydronic pump system.

The display may include a touchscreen display for the pump operator to touch in order to make the real time changes by the pump operator to the at least one control parameter to adjust the performance of the hydronic pump system.

The at least one control parameter may include a "set point" parameter and a control "curve shape" parameter; and the real time changes by the pump operator may include an adjustment to either the "set point" parameter, or the control "curve shape" parameter, or both the "set point" parameter and the control "curve shape" parameter.

The display may respond to the display control signaling and provide the at least one pump, system or control curve, including an instant pump curve, an instant system curve and a control curve.

The display control signaling may contain information about a designed system curve and a designed pump curve; and the display provides the designed system curve and designed pump curve in real time for viewing by the pump operator.

The display may respond to the display control signaling and provide one or more of the following:
pump pressure in psi,
pump flow in gpm,
pump power in kW and
pump motor speed n in rpm.

The display may respond to the display control signaling and provide a pump control design toolbox set up screen that includes one or more drop down menus to enter or select setup data by the pump operator, including the at least one control points for defining designed pump, system and control curves.

The real time changes by a pump operator may include, or take the form of, pump operator inputs to parameters displayed in fields, boxes, etc. on the display screen, e.g., via one or more keyboard inputs, as well pump operator touchscreen inputs to parameters, curves, virtual buttons, icons, or requirements displayed on the display screen, e.g., via one or more finger or stylus inputs.

The display screen may also include one or more control commend icons for the pump operator to touch by hand and/or actuate with the click of a mouse in order to implement the design/redesign of the at least one pump, system or control curve to adjust the performance of the hydronic pump system to correspond with the system flow and pressure requirement of the hydronic system. By way of example, the one or more control commend icons for the pump operator may include a commend icon so that an automatic pump control setup function may be realized to setup and run on a hydronic system automatically with the minimized pumping energy consumption. The signal processor or signal processing module may be configured to provide the corresponding signaling as control signaling to implement the design/redesign of the at least one pump, system or control curve to adjust the performance of the hydronic pump system to correspond with the system flow and pressure requirement of the hydronic system, e.g., consistent with the one or more control command icons touched or actuated by the pump operator.

By way of example, the signal processor or processing module may include, or take the form of, at least one signal processor and at least one memory including computer program code, and the at least one memory and computer program code are configured to, with at least one signal processor, to cause the signal processor at least to receive the signaling (or, for example, the further signaling) and determine the corresponding signaling, based upon the signaling received. The signal processor or processing module may be configured with suitable computer program code in order to implement suitable signal processing algorithms and/or functionality, consistent with that set forth herein.

By way of further example, the present invention may take the form of a method featuring:
receiving in a signal processor or signal processing module signaling containing information about a system characteristic curve, a system flow and pressure requirement for the hydronic pump system, and real time changes by a pump operator to at least one control parameter to adjust the performance of the hydronic pump system; and
determining in the signal processor or signal processing module corresponding signaling containing information about a design/redesign of at least one pump, system or control curve to adjust the performance of the hydronic pump system to correspond with the system flow and pressure requirement of the hydronic system, based upon the signaling received.

The method may also include one or more of the features set forth herein, including providing from the signal processor or processing module the corresponding signaling as control signaling to control a pump in a pumping system, e.g., including in such a pumping system.

The present invention provides a new technique that is a further development of, and builds upon, the aforementioned family of technologies set forth herein.

BRIEF DESCRIPTION OF THE DRAWING

The drawing includes the following Figures, which are not necessarily drawn to scale:

FIG. 1 includes FIGS. 1A and 1B showing examples of variable speed pump control systems with advanced energy saving and sensorless control technologies, e.g., in which the present invention may be implemented.

FIG. 2 shows an example of a display showing a pump control design toolbox implementation, according to some embodiments of the present invention.

FIG. 3 shows an example of a display showing a pump control design toolbox set up screen implementation, according to some embodiments of the present invention.

FIG. 4 shows an example of a touchscreen pumping control system with a pump control design toolbox, according to some embodiments of the present invention.

FIG. 5 shows an example of a display of a setup for a constant dynamic fraction loss system, according to some embodiments of the present invention.

FIG. 6 shows an example of a display of a setup with a limited dynamic fraction loss variation region, according to some embodiments of the present invention.

FIG. 7 shows an example of a display of a setup with a varying system within a full pump operation hydronic domain, according to some embodiments of the present invention.

FIG. 8 is a block diagram of apparatus for implementing a pump control design toolbox, e.g., having a signal processor or processing module, according to some embodiments of the present invention.

DETAILED DESCRIPTION OF THE INVENTION

1. Summary

According to the present invention, a pump control design toolbox modulated as a key part of a variable speed pump control with the new concept on pump control set up procedures to meet the flow and pressure requirement in the system is set forth herein. With its interactive, real time and on site features in nature, the pump control design toolbox makes the pump control setup procedures reformulated significantly, with which the pump control may be designed or redesigned throughout reconfiguring a desired pump characteristics curve and its corresponding control curve based upon the real time system characteristics on site. The pump control design toolbox may be used for any unknown hydronic systems applications to achieve the best pumping operation efficiency to save energy, with the pump control operation set up and maintenance procedures much easier. Besides all of those mentioned above, the introduction of the pump control design toolbox may have the potentials to trim down the pump manufacturing procedures for pump impeller trimming and testing significantly in the factory as well.

2. Pump Control Design Toolbox

The pump control design tool technique disclosed herein, e.g., which is schematically shown in FIG. 2, is a pump and control redesign toolbox module, with which the pump curve as well as its corresponding control curve may be designed or redesigned based upon the system characteristics curve displayed in real time on a display or display screen, as well as or along with the flow and pressure requirement in system.

Here, the maximum pump curve (MPC) and end of system curve (EOC), labeled accordingly, may be derived based upon a pump model selected from a database which contains the corresponding pump characteristics data. The maximum pump operation hydronic area is defined by the maximum pump curve (MPC) and the end of system curve (EOC), within which a varible speed pump can normally run. Note that the varible speed pump set forth herein is the pump together with its corresponding variable speed drive.

The instant system curve (ISC) as well as the instant pump curve (IPC) at a motor speed of n may derived as well, labeled accordingly, based upon the system flow equation and pump affinity law, having the corresponding instant system flow rate and pressure given by sensors or a sensorless converter. The instant pump curve (IPC) may vary from n=0 to the maximum pump curve (MPC) at n=60 Hz, while the instant system curve (IPC) may vary from $C_v=0$ to $C_v=C_{vEOC}$, limited with the maximum pump operation region that the pump may be run upon. Consequently, ultimate alarms may be set off, e.g., if the pumping operation is out of the maximum pump operation region to protect the pump from the EOC, and its associated adverse pump operating conditions.

With pump control design toolbox module disclosed herein, primarily, the designed pump curve (DPC) and design system curve (DSC), labeled accordingly, as well as its corresponding control curve (CCC), labeled accordingly, may be designed or redesigned interactively in real time and on site by the pump operator, e.g., based upon the system characteristics curve displayed on the display screen, as well as the flow and pressure requirement in system.

The pump and system curves designed (e.g., DPC and DSC in FIG. 2) to provide the desired pressure and flow rate in the system can be defined by the pump design point, or pump duty point, entered in the display screen by the pump operator. The control curve (e.g., CCC in FIG. 2), to derive an adaptive set point for pump control to meet the desired flow rate and pressure in system, is defined by two control parameters of the pressure "set point" and "curve shape". The pressure set point which defines the control curve position may be selected along the designed system curve (DSC). Here, the set point can be adjusted independently to allow the control curve to be a "little" closer to the system curve with respect to system flow requirement to achieve the better or improved pumping efficiency. The second parameter which defines the control curve shape is the "curve shape" parameter, e.g., which may be selected to define the control curve shape in between 0, "a linear control curve", and up to 100, "a quadratic curve" to allow the control curve to be "much" closer to the system to achieve a better or improved pumping efficiency.

With the pump operation region limited by the designed pump and system curves (e.g., DPC and DSC) for the given system, the instant pump curve (IPC) may vary from n=0 up to the designed pump curve (DPC) at $n=n_{design}$ Hz and the instant system curve (IPC) may vary from $C_v=0$ to $C_v=C_{vdesign}$, to provide the desired system flow and pressure instantly. Similarly, primary warnings may be set off, e.g., if the pumping operation is out of the designed pump operation region.

After the pump design curves as well as its corresponding control curve are set up, the pump may then be run, or be running, under one of the adaptive control modules set forth in reference nos. [1,2,5,7] in pump control to provide the desired flow rate and pressure in system.

FIG. 3 shows an example or prototype of a setup display screen for setting up the design and control curves with a dropdown or numeric box to enter or to select the setup data, which can enter the design point and parameters for defining the designed pump and system curves as well as its corresponding control curve. Alternatively and optimally, the design point and pressure set point discussed above may be entered in the graphic touch screen or drag "+" sympoles to the desired places directly.

In addition, numerical meters for pressure, flow rate, pump speed, power, and so forth, may be added in the graphic display screen directly as well to provide the real time reading outs of the pump operation and system operation data.

FIG. 4 shows an example or prototype of a pumping control system with the pump control design toolbox, which displays the pump characteristics curves and control curve in a graphic touch screen.

By utilizing the pump control design toolbox integrated in a touch screen pump controller introduced above, the pump and its corresponding control can be designed much easier to meet the system flow and pressure requirement. With these new features in the pump control design toolbox, the pump control and its setup procedures can be reformulated significantly, with an interactive design or redesign on the pump and system characteristics curves and the corresponding control curve, setting up interactively in real time on site, flexible for any unknown hydronic system, and easy to achieve the best pumping operation efficiency to save energy, easy for pump operation maintenance, in addition to the potentials for the reduction of needs on tedious and costly impeller trimming procedures. In addition, all the information regarding the pump, system, control operation and their corresponding read outs are displayed graphically and numerically, which makes the pump operation and maintenance much easier and quicker for the pump operator to implement as well.

Several energy saving control algorithms or their functional modules, in particular the adaptive flow control and adaptive system control in reference nos. [1-2,5,7] set forth below, may be integrated with the pump control design toolbox in the pump control to save pumping operation energy. Here, the energy saving control functional module yields an adaptive pressure control set point with respect to the real time system flow rate or the instant system variation position.

With a hydronic system recognition module and a moving flow peak detector integrated with system and flow adaptive control in reference no. [7] set forth below, an automatic pump control setup function may be realized to derive the desired pump design point as well as a minimum pressure set point automatically. For that, with one push button or icon of "Auto Cntl" in the pump control design toolbox, the pump control can be setup and run automatically for a known or unknown hydronic system with the minimized pumping energy consumption.

An energy saving module regarding outdoor temperature variation as well as day and night temperature scheduling functional module may be realized and integrated into the pump control design toolbox in the pump control to save pumping operation energy in the consideration with those environmental circumstances as well.

The flow and pressure signals for the energy saving control as mentioned in the pump control design toolbox platform herein may be provided by a sensorless converter or by sensors as well, to obtain the real time pump, system and control characteristics curves displayed in screen.

Moreover, the graphic touch screen display (e.g., see also element 10c in FIG. 8) in the pump control design toolbox will be one of the best ways for selecting or entering the design point and for displaying the curves and operation data as well. Alternatively, some low cost programmable logic devices (PLDs) or even printed circuit (PC) boards may also be feasible for a pump control design toolbox as well, as long as the pump design point and set point can be entered and the corresponding real time system coefficient of $C_v$ as a digital value can be provided for design and control set up reference. Also, some better graphic touch screen display techniques may be used as well by utilizing the techniques and procedures introduced in the pump control design toolbox.

3. General Setup Procedures

As one skilled in the art would appreciate, the highest pumping efficiency may be obtained when the control curve is aligned with the system curve. In other words, the adaptive pressure set point derived from the control curve should typically be on or nearby the system curve, so that the system will not be under pressured or over pressured in order to obtain a desired flow rate in system. The pumping operation energy may, therefore, be minimized to reduce the operation cost. With the pump control design toolbox introduced or set forth herein, the control curve can be set up to align with the system curve easily, in particular for a hydronic system with the constant dynamic friction loss in nature. For a varying dynamic friction loss system, such as a system with a control valve or a flow regulator, however, a little more attention may need to be paid in order to set the designed pump curve (DPC) and its corresponding control curve (CCC) up with the highest pumping efficiency to save energy.

The system variation regions for an unknown system in the field may be observed on the display screen easily by using the pump control design toolbox, according to the present invention. The desired pump design point and pressure set point, e.g., to defined the design pump curve (DPC) and the design system curve (DSC) as well as the corresponding control curve (CCC) to meet the system flow and pressure requirement with the highest pumping efficiency to save energy, may be defined accordingly. Several application examples to achieve the best efficiency pumping control over a system given by using the in-situ real time interactive pump control design toolbox are introduced as follows respectively.

a) A Constant Dynamic Fraction Loss System:

Considering a system with the constant dynamic fraction loss, the pump design point, e.g., which defines the designed pump curve and the designed system curve, may be chosen first with respect to its system curve displayed on the display screen as well as the flow and pressure requirement in system. In general, the pump design point, e.g., to meet a maximum system pressure and flow rate requirement of (e.g., 150 psi, 360 gpm), can be set up right on the system curve displayed on the screen shown schematically in FIG. 5, to achieve the best efficiency on pumping system. Alternatively it can be varied a bit off toward the upper right on top of the point considered.

The pressure set point, e.g., which defines the control curve position, may be selected along and downwards the designed system curve (DSC) independently, and can be adjusted to allow the control curve to be a little closer to the system to achieve the better or improved pumping efficiency.

For instance, the pressure setpoint (SP) of 130 psi together with a "curve shape" numeric number of 15 may be set up along the control curve to meet the maximum pressure requirement in the system. Also, the control curve shape, defined by control "curve shape" parameter, may be selected as well inbetween 0, a "linear control curve", and 100, "a quadratic curve" to allow the control curve to be a little closer to the system to achieve the better or improved pumping efficiency.

After the pump design curves as well as its corresponding control curve set up, the pump may then be run, or be running, under one of the adaptive control modules in the pump control design toolbox to provide the desired flow rate and pressure in system.

b) A Varying System with a Limited Dynamic Fraction Loss Varation Region:

By way of further example, when considering a system with a varying dynamic fraction loss from its minimum ($Cv=Cv\_min$) to its maximum ($Cv-max$), the pump design point, e.g., which defines the designed pump curve and system curve, may be chosen first with respect to system maximum position displayed on the display screen as well as the maximum flow and pressure requirement in system, for instance, (e.g., 150 psi, 360 gpm). The design point of the pressure and flow rate can be defined right on the maximum system curve (on or nearby the designed system curve) as schematically shown in FIG. 6, to achieve the best efficiency on pumping system possibly.

Similarly, the control curve pressure set point as well as its curve shape may be selected along and downwards the designed system curve independently and adjusted to allow the control curve to be closer to the system to achieve the better or improved pumping efficiency. For instance again, the pressure setpoint (SP) of 130 psi together with a "curve shape" numeric number of 15 may be set up along the control curve to meet the maximum pressure requirement in the system. After the pump design curves as well as its corresponding control curve set up, the pump may then be run, or be running, under one of the adaptive control modules in the pump control design toolbox to provide the desired flow rate and pressure in system.

c) A Varying System within Full Pump Operation Hydronic Domain:

By way of further example, when considering a system with a dynamic fraction loss from a shutoff position to a fully open position up to the pump best efficiency curve (BEC), the pump design point, e.g., which defines the designed pump curve and designed system curve, may be chosen with respect to the pump best efficiency curve (BEC) displayed on the display screen as well as the flow and pressure requirement in the system, as shown in FIG. 7 schematically. The design point of the pressure and flow rate can be defined right on the BEC curve or a little offset to the upper right on top of that point alternatively, to achieve the best efficiency on pumping system possibly.

The pressure set point, e.g., which defines the control curve, may now be selected along the designed system curve on BEC. Again, the pressure set point and curve shape can be adjusted independently as well to make the control curve a little closer to the system for the better or improved pumping efficiency.

In general, the pump duty point defined around its best efficiency point (BEP) through the pump BEC may be choosen as the pump design point, if there may be no other specific requirement given. Under that, during the pumping operation, the adaptive pressure setpoint derived is typically always near or close to PBC curve so that pump operation energy may be saved accordingly.

FIG. 8: Implementation of Signal Processing Functionality

By way of further example, FIG. 8 shows apparatus 10 according to some embodiments of the present invention for implementing the associated signal processing functionality. The apparatus features a signal processor or processing module 10a configured at least to:

receive signaling containing information about a system characteristic curve, a system flow and pressure requirement for the hydronic pump system, and real time changes by a pump operator to at least one control parameter to adjust the performance of the hydronic pump system; and determine corresponding signaling containing information about a design/redesign of at least one pump, system or control curve to adjust the performance of the hydronic pump system to correspond with the system flow and pressure requirement of the hydronic system, based upon the signaling received.

In operation, the signal processor or processing module 10a may be configured to provide corresponding signaling as control and/or display signaling to control the hydronic pump system and/or to implement display functionality on a display 10c (e.g., see FIG. 8) related to the pump control design toolbox.

The signal processor or processing module 10a may be configured in, or form part of, the pump control design toolbox, or a pump system and/or a pump system control, e.g., which may include or be implemented in conjunction with one or more pump controls or controllers configured therein. By way of example, embodiments are envisioned in which the apparatus is a pump system having a pump system controller or controller with the signal processor or processing module 10a, and embodiments are envisioned in which the apparatus is, or takes the form of, the one or more pump controls or controllers having the signal processor or processing module 10a.

By way of example, the functionality of the apparatus 10 may be implemented using hardware, software, firmware, or a combination thereof. In a typical software implementation, the apparatus 10 would include one or more microprocessor-based architectures having, e.g., at least one signal processor or microprocessor like element 10a. One skilled in the art would be able to program with suitable program code such a microcontroller-based, or microprocessor-based, implementation to perform the functionality described herein without undue experimentation. For example, the signal processor or processing module 10a may be configured, e.g., by one skilled in the art without undue experimentation, to receive signaling containing information about a system characteristic curve, a system flow and pressure requirement for the hydronic pump system, and real time changes by a pump operator to at least one control parameter to adjust the performance of the hydronic pump system, consistent with that disclosed herein.

Moreover, the signal processor or processing module 10a may be configured, e.g., by one skilled in the art without undue experimentation, to determine the corresponding signaling containing information about a design/redesign of at least one pump, system or control curve to adjust the performance of the hydronic pump system to correspond with the system flow and pressure requirement of the hydronic system, based upon the signaling received, consistent with that disclosed herein.

The scope of the invention is not intended to be limited to any particular implementation using technology either now known or later developed in the future. The scope of the invention is intended to include implementing the functionality of the processors 10a as stand-alone processor, signal processor, or signal processor module, as well as separate processors or processor modules, as well as some combination thereof.

The apparatus 10 may also include, e.g., other signal processor circuits or components 10b, including random access memory or memory module (RAM) and/or read only memory (ROM), input/output devices and control, and data and address buses connecting the same, and/or at least one input processor and at least one output processor, e.g., which would be appreciate by one skilled in the art.

Various Points of Novelty

The present invention may also include, or take the form of, one or more of the following embodiments/implementations:

According to some embodiments, the present invention may include, or take the form of, implementations where the pump control design toolbox technique for a pump control includes primarily an in-situ real time interactive pump control design toolbox, with which a desired pump control curve may be obtained throughout a design pump characteristics curve reconfigured interactively and real time based upon the system characteristics on site, to meet the flow and pressure requirement in system. The pump control design toolbox makes the pump control setup procedures reformulated significantly, with the pump control operation set up and maintenance much easier and for any unknown hydronic systems applications to achieve the best pumping operation efficiency to save energy. It may considerably reduce the requirement for pump manufacturing procedures on impeller trimming in factory as well.

According to some embodiments, the present invention may include, or take the form of, implementations where the pump control design toolbox technique may include a touch screen module with the pump control characteristics curves and design numeric settings, e.g., which is schematically shown in FIGS. 2-4. Here, the maximum pump curve (MPC) and end of system curve (EOC), is derived based upon a pump model selected from the database which contains the corresponding pump characteristics data. The maximum pump operation hydronic region is defined by the maximum pump curve (MPC) and the end of system curve (EOC), within which a varible speed pump can normally run. Note that the varible speed pump set forth herein may be configured as the pump together with its varible speed drive. The instant system curve (ISC) as well as the instant pump curve (IPC) at a motor speed of n may derived as well, based upon the syslem flow equation and pump affinity law, having the corresponding instant system flow rate and pressure given by sensors or a sensorless converter. The instant pump curve (IPC) may vary from n=0 to the maximum pump curve (MPC) at n=60 Hz, while the instant system curve (ISC) may vary from $C_v=0$ to $C_v=C_{vEOC}$, limited with the maximum pump operation region that pump may be run upon. Consequently, ultimate alarms may be set off, e.g., if the pumping operation is out of the maximum pump operation region to protect the pump from EOC. With an in-situ pump control design toolbox module disclosed herein, primarily, the designed pump curve (DPC) and the design system curve (DSC) as well as its corresponding control curve (CCC) may be designed or redesigned interactively in real time and on site, e.g., based upon the system characteristics curve displayed on the display screen as well as the flow and pressure requirement in system. The pump and system curves designed to provide the desired pressure and flow rate in the system can be defined by the pump design point, or by the pump duty point, entered in the display screen, e.g., by the pump operator. The control curve, e.g., to derive an adaptive set point for pump control to meet the desired flow rate and pressure in system, may be defined by two control parameters of the pressure "set point" and "curve shape". The pressure set point which defines the control curve position may be selected along the designed system curve. Here, the set point can be adjusted independently to allow the control curve to be a little closer to the system curve with respect to system flow requirement to achieve the better or improved pumping efficiency. The second parameter which defines the control curve shape is the "curve shape" parameter with which may be selected to define the control curve shape in between 0, "a linear control curve", and 100, "a quadratic curve" to allow the control curve to be closer to the system to achieve the better or improved pumping efficiency. With the pump operation region limited by the designed pump curve (DPC) and the designed system curve (DSC) for the given system, the instant pump curve may vary from n=0 up to the designed pump curve (DPC) at n=$n_{design}$ Hz and the instant system curve (ISC) may vary from $C_v$=0 to $C_v$=$C_{vdesign}$, to provide the desired system flow and pressure instantly. Similarly, primary warnings may be set off, e.g., if the pumping operation is out of the designed pump operation region. After the pump design curves as well as its corresponding control curve set up, the pump may then be run, or be running, under one of the adaptive control modules integrated with pump control design toolbox to provide the desired flow rate and pressure in system.

According to some embodiments, the present invention may include, or take the form of, implementations where the settings for the design and control curves in the pump control design toolbox technique may be realized with a dropdown or nemeric box to enter or to select the setup data as shown in FIG. 3, which can be used to enter the design point and parameters for defining the designed pump and system curves as well as its control curve. Alternatively and optimally, the design point and pressure set point discussed above may be entered in the graphic touch screen or drag "+" sympoles to the desired places directly.

According to some embodiments, the present invention may include, or take the form of, implementations where the pump control design toolbox technique may include some numerical meters as well for pressure, flow rate, pump speed, power, and so forth, which may be added in the graphic screen displayed directly to provide the real time reading outs of pump operation and system operation data.

According to some embodiments, the present invention may include, or take the form of, implementations where the maximum pump curve (MPC) and its corresponding end of curve (EOC) in the pump control design toolbox technique may include the data array entered on the display screen through the dropdown box or hard coded data. Preferably, the data is selectable through the integrated pump manufacturer database.

According to some embodiments, the present invention may include, or take the form of, implementations where the instant real time flow rate and pressure signals utilized in the pump control design toolbox technique may include the signals derived from all feasible technique including, sensors, sensorless, or their alternatives, e.g., consistent with that set forth herein. The signals may be used for deriving real time system curve and adaptive pressure control set point as well.

According to some embodiments, the present invention may include, or take the form of, implementations where the pump control design toolbox technique disclosed herein may also include some other PLDs or PC boards with all or partial functionalities and procedures described herein on the touch screen, as long as the pump and control characteristics design or redesign concept for obtaining a desired pump control to meet system flow and pressure requirement to save energy described here can be realized.

According to some embodiments, the present invention may include, or take the form of, implementations where the control curve for the adaptive pump controls integrated with the pump control design toolbox technique may include several energy saving control algorithms or their functional modules disclosed in reference nos. [1-2,5,7] set forth herein, e.g., to derive an adaptive pressure control set point with respect to the real time system flow rate and pressure at an instant system variation position for saving pump operation energy.

According to some embodiments, the present invention may include, or take the form of, implementations where the adaptive pump controls integrated with the pump control design toolbox technique may include a hydronic system recognition module and a moving flow peak detector integrated with system and flow adaptive control set forth in reference no. [7] herein, e.g., an automatic pump control setup function may be realized to derive the desired pump design point as well as minimum pressure set point automatically. For that, and by way of example, with a suitable one push button or icon for an "Auto Cntl" in the pump control design toolbox, the pump control can be setup and run automatically for a known or unknown hydronic system with the minimized pumping energy consumption.

According to some embodiments, the present invention may include, or take the form of, implementations where an energy saving module integrated with the pump control design toolbox technique may include an energy saving module regarding outdoor temperature variation as well as a day and night temperature scheduling functional module, e.g., which may be realized and integrated into the pump control design toolbox in the pump control to save pumping operation energy in the consideration with those environmental circumstances as well.

According to some embodiments, the present invention may include, or take the form of, implementations where the pumping hydronic system may include all close loop or open loop hydronic pumping systems, such as primary pumping systems, secondary pumping systems, water circulating systems, and pressure booster systems. The systems mentioned here may consist of a single zone or multiple zones as well.

According to some embodiments, the present invention may include, or take the form of, implementations where the hydronic signals derived by sensors or a sensorless converter disclosed herein may include pump differential pressure, system pressure or zone pressure, system or zone flow rate, and so forth.

According to some embodiments, the present invention may include, or take the form of, implementations where control signals transmitted and wiring technologies disclosed herein may include all conventional sensing and transmitting technique that are used currently. Preferably, wireless sensor signal transmission technologies may be optimized.

According to some embodiments, the present invention may include, or take the form of, implementations where the pumps disclosed herein for the hydronic pumping systems disclosed herein may include a single pump, a circulator, a group of parallel ganged pumps or circulators, a group of serial ganged pumps or circulators, or their combinations.

Computer Program Product

The present invention may also, e.g., take the form of a computer program product having a computer readable medium with a computer executable code embedded therein for implementing the method, e.g., when run on a signal processing device that forms part of such a pump or valve controller. By way of example, the computer program product may, e.g., take the form of a CD, a floppy disk, a memory stick, a memory card, as well as other types or kind of memory devices that may store such a computer executable code on such a computer readable medium either now known or later developed in the future.

OTHER RELATED APPLICATIONS

The application is related to patent applications that form part of the overall family of technologies developed by one or more of the inventors herein, assigned to the assignee of the present application, and disclosed in the patent documents, as follows:

Reference [1]: U.S. application Ser. No. 12/982,286, filed 30 Dec. 2010, entitled "Method and apparatus for pump control using varying equivalent system characteristic curve, AKA an adaptive control curve," which issued as U.S. Pat. No. 8,700,221 on 15 Apr. 2014;

Reference [2]: U.S. application Ser. No. 13/717,086, filed 17 Dec. 2012, entitled "Dynamic linear control methods and apparatus for variable speed pump control," which claims benefit to U.S. provisional application No. 61/576,737, filed 16 Dec. 2011, now abandoned;

Reference [3]: U.S. application Ser. No. 14/091,795, filed 27 Nov. 2013, entitled "3D sensorless conversion method and apparatus," which claims benefit to U.S. provisional application No. 61/771,375, filed 1 Mar. 2013, now abandoned;

Reference [4]: U.S. application Ser. No. 14/187,817, filed 24 Feb. 2014, entitled "A Mixed Theoretical And Discrete Sensorless Converter For Pump Differential Pressure And Flow Monitoring," which claims benefit to U.S. provisional application No. 61/803,258, filed 19 Mar. 2013, now abandoned;

Reference [5]: U.S. application Ser. No. 14/339,594, filed 24 Jul. 2014, entitled "Sensorless Adaptive Pump Control with Self-Calibration Apparatus for Hydronic Pumping System," which claims benefit to U.S. provisional application Ser. No. 61/858,237 filed 25 Jul. 2013, now abandoned;

Reference [6]: U.S. application Ser. No. 14/680,667, filed 7 Apr. 2015, entitled "A Best-fit affinity sensorless conversion technique for pump differential pressure and flow monitoring," which claims benefit to provisional patent application Ser. No. 61/976,749, filed 8 Apr. 2014, now abandoned;

Reference [7]: U.S. application Ser. No. 14/730,871, filed 4 Jun. 2015, entitled "System and flow adaptive sensorless pumping control apparatus energy saving pumping applications," which claims benefit to provisional patent application Ser. No. 62/007,474, filed 4 Jun. 2014, now abandoned;

Reference [8]: U.S. application Ser. No. 15/044,670, filed 16 Feb. 2016, entitled "Detection means for sensorless pumping control applications," which claims benefit to U.S. provisional application No. 62/116,031, filed 13 Feb. 2015, entitled "No flow detection means for sensorless pumping control applications;"

Reference [9]: U.S. application Ser. No. 15/173,781, filed 6 Jun. 2016, entitled "Direct numeric affinity pumps sensorless converter," which claims benefit to provisional patent application Ser. No. 62/170,997, filed 4 Jun. 2015, now abandoned; and Reference [10]: U.S. application Ser. No. 15/217,070, filed 22 Jul. 2016, entitled "Advanced real time graphic sensorless energy saving pump control system," which claims benefit to provisional patent application Ser. No. 62/196,355, now abandoned;

which are all assigned to the assignee of the instant patent application, and which are all incorporated by reference in their entirety herein.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. An apparatus for providing variable speed pump control in a hydronic pump system having a system flow and pressure requirement, comprising:
 a signal processor or processing module configured to:
   receive signaling containing information about
     a system characteristic curve (Sys) for the hydronic pump system,
     a system flow and pressure requirement for the hydronic pump system, and
     real time changes by a pump operator to at least one control parameter to adjust the performance of the hydronic pump system; and
   determine corresponding signaling containing information about a design/redesign of a pump curve (DPC), a system curve (DSC) and a control curve (CCC) to adjust the performance of the hydronic pump system to correspond with the system characteristic curve (Sys), the system flow and pressure requirement and the real time changes of the hydronic pump system, based upon the signaling received.

2. The apparatus according to claim 1, wherein the apparatus includes, or forms part of, a pump control design toolbox configured with a combination of the signal processor or processing module and a display for providing display functionality related to the pump control design toolbox.

3. The apparatus according to claim 1, wherein
the signal processor or processing module is configured to provide the corresponding signaling as display control signaling; and
the apparatus comprises a display that responds to the display control signaling and provides display signaling containing information about:
at least one of the system characteristic curve (Sys) and the system flow and pressure requirement for the hydronic pump system; and
a pump control design toolbox set up screen having the at least one control parameter to adjust the performance of the hydronic pump system.

4. The apparatus according to claim 3, wherein the display is a touchscreen display for the pump operator to touch in order to make the real time changes by the pump operator to the at least one control parameter to adjust the performance of the hydronic pump system.

5. The apparatus according to claim 3, wherein the display responds to the display control signaling and provides the pump curve (DPC), the system curve (DSC) and the control curve (CCC).

6. The apparatus according to claim 3, wherein
the display control signaling contains information about the system curve (DSC) and the pump curve (DPC); and
the display provides the system curve (DSC) and the pump curve (DPC) in real time for viewing by the pump operator.

7. The apparatus according to claim 3, wherein the display responses to the display control signaling and provides one or more of the following:
pump pressure in psi,
pump flow in gpm,
pump power in kW and
pump motor speed n in rpm.

8. The apparatus according to claim 3, wherein the display responds to the display control signaling and provides a pump control design toolbox set up screen that includes one or more drop down menus to enter or select setup data by the pump operator, including the at least one control points for defining the pump curve (DPC), the system curve (DSC) and the control curve (CCC).

9. The apparatus according to claim 1, wherein
the at least one control parameter includes a "set point" parameter and a control "curve shape" parameter; and
the real time changes by the pump operator include an adjustment to either the "set point" parameter, or the control "curve shape" parameter, or both the "set point" parameter and the control "curve shape" parameter.

10. A method for providing variable speed pump control in a hydronic pump system having a system flow and pressure requirement, comprising:
receiving in a signal processor or signal processing module signaling containing information about a system characteristic curve (Sys), a system flow and pressure requirement for the hydronic pump system, and real time changes by a pump operator to at least one control parameter to adjust the performance of the hydronic pump system; and
determining in the signal processor or signal processing module corresponding signaling containing information about a design/redesign of a pump curve (DPC), a system curve (DSC) and a control curve (CCC) to adjust the performance of the hydronic pump system to correspond with the system characteristic curve (Sys), the system flow and pressure requirement and the real time changes of the hydronic pump system, based upon the signaling received.

11. The method according to claim 10, wherein the method comprises configuring the signal processor or signal processing module in, or as part of, a pump control design toolbox having a display for providing display functionality related to the pump control design toolbox.

12. The method according to claim 10, wherein the method comprises:
configuring the signal processor or processing module to provide the corresponding signaling as display control signaling; and
responding with a display to the display control signaling and providing display signaling containing information about:
at least one of the system characteristic curve (Sys) and the system flow and pressure requirement for the hydronic pump system; and
a pump control design toolbox set up screen having the at least one control parameter to adjust the performance of the hydronic pump system.

13. The method according to claim 12, wherein the method comprises:
using as the display a touchscreen display for the pump operator to touch in order to make the real time changes by the pump operator to the at least one control parameter to adjust the performance of the hydronic pump system.

14. The method according to claim 12, wherein the method comprises: responding with the display to the display control signaling and providing the pump curve (DPC), the system curve (DSC) and the control curve (CCC).

15. The method according to claim 12, wherein the method comprises:
including in the display control signaling information about the system curve (DSC) and the pump curve (DPC); and
providing from the display the system curve (DSC) and the pump curve (DPC) in real time for viewing by the pump operator.

16. The method according to claim 12, wherein the method comprises: responding with the display to the display control signaling and providing one or more of the following:
pump pressure in psi,
pump flow in gpm,
pump power in kW and
pump motor speed n in rpm.

17. The method according to claim 12, wherein the method comprises: responding with the display to the display control signaling and providing a pump control design toolbox set up screen that includes one or more drop down menus to enter or select setup data by the pump operator, including the at least one control points for defining the pump curve (DPC), the system curve (DSC) and the control curve (CCC).

18. The method according to claim 10, wherein the method comprises:
including as the at least one control parameter a "set point" parameter and a control "curve shape" parameter; and
including as the real time changes by the pump operator an adjustment to either the "set point" parameter, or the control "curve shape" parameter, or both the "set point" parameter and the control "curve shape" parameter.

19. A pump control design toolbox for providing variable speed pump control in a hydronic pump system having a system flow and pressure requirement, comprising:
- a display having pump control design toolbox set up screen configured to display information about:
  - a system characteristic curve (Sys) for the hydronic pump system,
  - a system flow and pressure requirement for the hydronic pump system; and
  - at least one control parameter to adjust the performance of the hydronic pump system; and
- a pump system controller having a signal processor or processing module configured to:
  - receive signaling containing information about
    - the system characteristic curve (Sys) displayed for the hydronic pump system,
    - the system flow and pressure requirement displayed for the hydronic pump system, and
    - real time changes to the at least one control parameter provided by a pump operator to adjust the performance of the hydronic pump system; and
  - provide corresponding signaling containing information about a design/redesign of a pump curve (DPC), a system curve (DSC) and a control curve (CCC) to adjust the performance of the hydronic pump system to correspond with the system characteristic curve (Sys), the system flow and pressure requirement and the real time changes of the hydronic pump system, based upon the signaling received.

20. The pump control design toolbox according to claim 19, wherein
- the signal processor is configured to provide display control signaling containing information about the system characteristic curve (Sys), the system flow and pressure requirement for the hydronic pump system, and the at least one control parameter to adjust the performance of the hydronic pump system; and
- the display having the pump control design toolbox set up screen is configured to receive the display control signaling and display the information about the system characteristic curve (Sys), the system flow and pressure requirement for the hydronic pump system, and the at least one control parameter.

* * * * *